United States Patent [19]

Azuma et al.

[11] Patent Number: 4,581,659
[45] Date of Patent: Apr. 8, 1986

[54] METHOD AND APPARATUS FOR REPRODUCING INFORMATION AT VARIABLE SPEEDS FROM A MAGNETIC TAPE

[75] Inventors: Nobuo Azuma, Katsuta; Kenji Satoh, Yokohama; Katsuo Mohri, Yokoshuka; Yoshinori Masuda, Katsuta, all of Japan

[73] Assignee: Hitachi, Ltd., Tokyo, Japan

[21] Appl. No.: 564,904

[22] Filed: Dec. 23, 1983

[30] Foreign Application Priority Data

Dec. 24, 1982 [JP] Japan ................. 57-226045

[51] Int. Cl.⁴ .......................................... H04N 5/783
[52] U.S. Cl. .................. 360/10.2; 360/74.4; 360/10.3
[58] Field of Search ............ 360/10.2, 10.3, 77, 360/35.1, 74.4, DIG. 1; 358/312, 323

[56] References Cited

U.S. PATENT DOCUMENTS

| 4,148,082 | 4/1979 | Okada et al. | 360/77 |
| 4,255,768 | 3/1981 | Kubota | 360/10.2 |
| 4,322,755 | 3/1982 | Kosaka | 360/10.3 |
| 4,404,601 | 9/1983 | Sakamoto | 360/10.3 |
| 4,426,665 | 1/1984 | Bradford | 360/10.2 |
| 4,445,146 | 4/1984 | Sakamoto et al. | 360/10.3 |

Primary Examiner—Donald McElheny, Jr.
Attorney, Agent, or Firm—Antonelli, Terry & Wands

[57] ABSTRACT

A method and apparatus for reproducing information at variable speeds from a magnetic tape by correcting a deviation between at least one video track of the magnetic tape and a rotating head during a tape stop state of an intermittent drive for a noiseless slow-still picture in a video tape recorder using pilot signals. A series of pulses produced by a frequency generator of a capstan for feeding the tape is counted during the tape feeding state of an intermittent drive in order to detect a timing of the stopping of the tape feeding. As the count number equals a set value corresponding to a regular amount of feeding of the tape during the intermittent drive, the tape feeding is controlled to stop. A tracking error signal is produced from the pilot signals reproduced from the tape by the rotating head within the tape stop state of the intermittent drive and the set value for the next tape feeding of the intermittent drive is adjusted in response to the tracking error signal.

19 Claims, 10 Drawing Figures

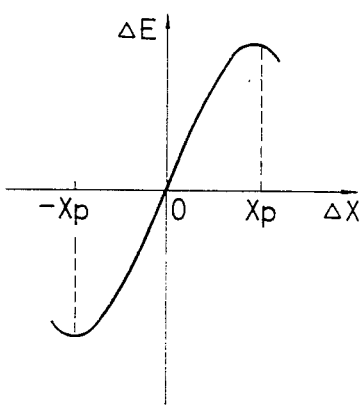
FIG. 4
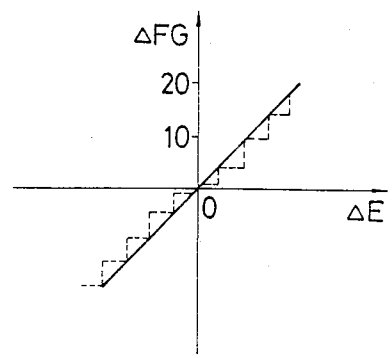
FIG. 7
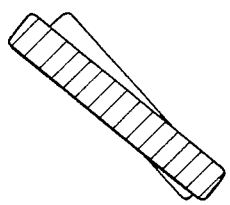
FIG. 5(I)
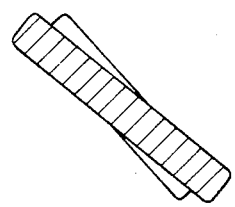
FIG. 5(II)
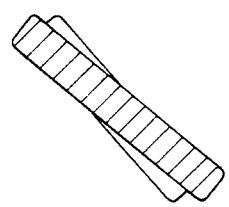
FIG. 5(III)
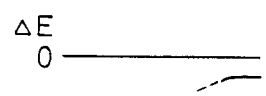
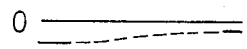
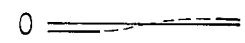

METHOD AND APPARATUS FOR REPRODUCING INFORMATION AT VARIABLE SPEEDS FROM A MAGNETIC TAPE

BACKGROUND OF THE INVENTION

This invention relates to a method and apparatus for reproducing information from a magnetic tape, especially a method for a variable speed reproduction by intermittently driving the magnetic tape.

In a rotating head helical scan type tape recorder (hereinafter VTR) of the prior art, a synchronizing signal is usually recorded on the magnetic tape during a recording mode, and the recorded synchronizing signal is reproduced during a reproducing mode for controlling a rotating phase of a capstan or a rotating cylinder by a servo circuit so that the rotating heads correctly trace the video tracks on which a video signal is recorded. Generally, for the synchronizing signal, control pulses (hereinafter CTL pulses), which are a series of pulses having a frequency one-half of that of a vertical synchronizing signal, are continuously recorded on one edge of the magnetic tape.

In a system using the CTL pulses, even if the magnetic tape is driven at variable speeds as occur with an intermittent drive for a noiseless slow motion picture reproduction, the position of the rotating heads with respect to the video tracks are absolutely determined at the time of detection of the CTL pulses. Therefore, in the system using the CTL pulses, it is easy to reproduce the video signal using an intermittent drive for the noiseless slow motion picture, in which the magnetic tape is stopped at one of the noiseless still states and is normally moved to the next noiseless still state, which is one frame period apart from the former one. By repeating the intermittent drive at a proper time-interval, the video signal is reproduced in noiseless slow motion. Accordingly, in the system using the CTL pulses, the variable speed reproduction by the intermittent drive is simply realized by executing a stop control which contains a reverse braking of a capstan motor after some time delay from the detection of one of the CTL pulses.

However, the above-mentioned reproduction cannot be used in other servo systems, for example, a system of the type in which pilot signals are recorded on the video tracks as synchronizing signals as disclosed in U.S. Pat. No. 4,056,832 and U.S. Pat. No. 4,297,733. The aforementioned patents only describe a system using pilot signals having three or four frequencies as a tracking signal for accurately reproducing the video signal at a normal tape speed.

SUMMARY OF THE INVENTION

Accordingly, it is an object of the present invention to provide a method for reproducing information from a magnetic tape at any tape speed in a system using pilot signals as a tracking signal and an apparatus thereof.

It is another object of the present invention to provide a method for reproducing a video signal for a noiseless slow motion picture from a video tape by using an intermittent drive in a helical scan type VTR utilizing pilot signals as a tracking signal and an apparatus for carrying out the method.

Briefly, to attain the above mentioned objects, according to the present invention, a series of pulses from a frequency generator of a capstan for driving a tape is counted during one intermittent drive in order to detect a timing for the stopping of the feeding of the tape until the count number becomes a set value corresponding to a regular amount of feeding the tape of one intermittent drive, a tracking error signal is produced from the pilot signals reproduced from the tape during the tape stop state of the intermittent drive, and the set value of the count number is adjusted in response to the tracking error signal.

Further, in accordance with a feature of the present invention, in order to increase accuracy of the tracking error signal, the tracking error signal is averaged by the integration thereof during at least one field period within the tape stop state of the intermittent drive.

BRIEF DESCRIPTION OF THE DRAWINGS

FIG. 4 represents a characteristic of a sampled tracking error signal in response to a deviation ($\Delta X$).

FIGS. 5(I), 5(II) and 5(III) illustrate the relationship between a trace effected by a head, a tracking error signal and control signals (CMRUN and REVERSE).

FIG. 7 represents a characteristic waveform of an optimum unit value ($\Delta FG$) in response to the tracking error signal in accordance with another embodiment.

DETAILED DESCRIPTION OF THE PREFERRED EMBODIMENTS

Figure 1:
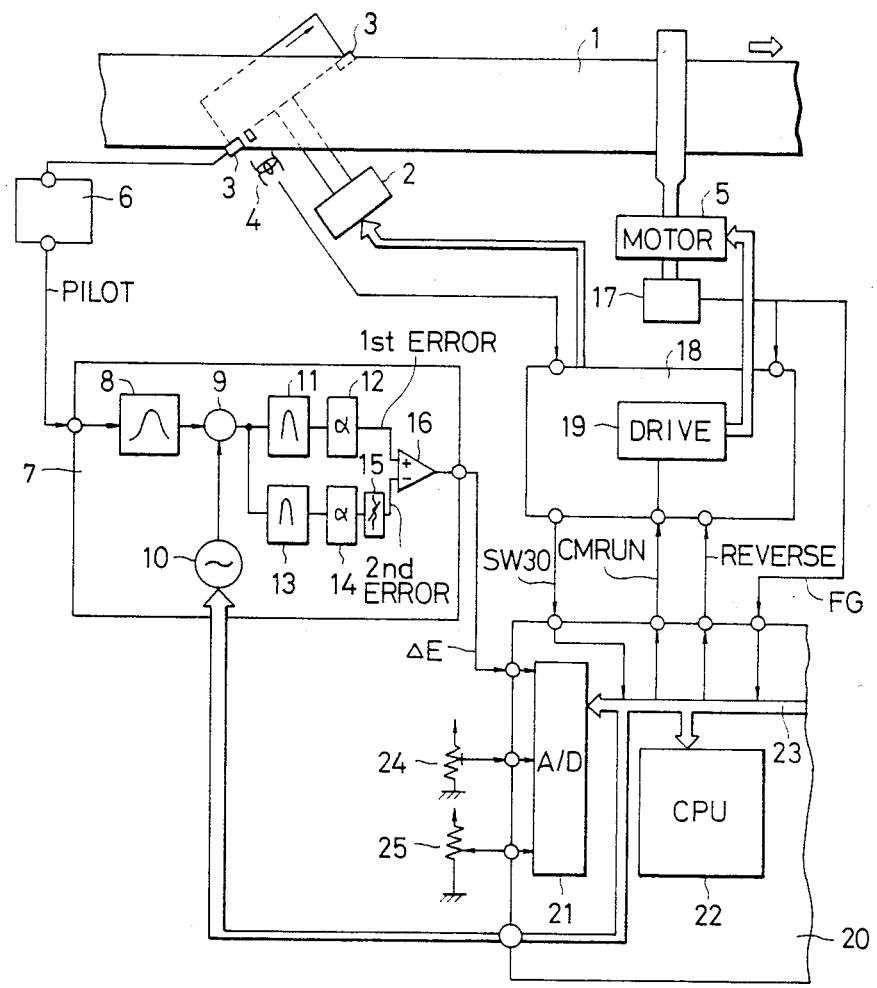
FIG. 1 is a block diagram representation of an apparatus for reproducing a video signal at variable speeds according to an embodiment of the present invention.

Referring to FIG. 1, the apparatus of the present invention includes a video tape 1 on which a video signal and pilot signals are recorded on tracks thereof, a cylinder motor 2 for rotating magnetic heads 3, a tach head 4 and a capstan motor 5 for rotating a capstan for feeding the tape. As is well known, the tach head 4 generates a series of tach pulses by detecting a rotating phase of the cylinder motor 2. The tach pulses are used for producing a head exchanging signal (SW30) indicative of the exchange of the heads. A processing circuit 6 receives the video and pilot signals picked up by the head 3 and provides an output of the pilot signals to a circuit 7 for generating a tracking error signal from the pilot signals. The tracking error signal generating circuit 7 includes a bandpass filter (hereinafter BPF) 8 for selectively passing the pilot signals having four frequencies, which are described hereafter.

The pilot signals passed by BPF 8 are mixed with a selected one of output signals of a local frequency generator 10 at a mixer 9. The output signals of the local frequency generator have the same frequencies as at least selected ones of the pilot signals. The mixer 9 produces output signals having additive and subtractive frequencies between the frequencies of the passed pilot signals and the frequency of the output signal of the local frequency generator 10. BPFs 11 and 13 selectively pass a signal having a particular subtractive frequency, respectively. Detectors 12 and 14 connected to the outputs of BPFs 11 and 13 generate a first error signal and a second error signal, respectively, with the first error signal being directly transferred to a comparator 16, and the second error signal being transferred to the comparator 16 through a variable resistor 15. The comparator 16 generates the tracking error signal (ΔE) as the output of the circuit 7.

As shown in FIG. 1, a frequency generator 17 is provided for generating a series of pulses (FG) in response to the rotation of the capstan motor 5 which is controlled by a driver 19 of a servo circuit 18. Further, a controller 20 such as a microcomputer having an analog digital converter 21, a central processing unit (hereinafter CPU) 22 and a bus line 23 is also provided. Variable resistors 24 and 25 are provided for controlling movement of the magnetic tape 1 in the intermittent drive as will be described hereafter.

Figure 2:
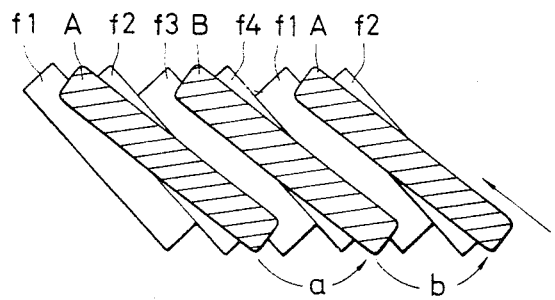
FIG. 2 illustrates video tracks for explaining the embodiment of FIG. 1.

In the present embodiment, pilot signals of four frequencies f1(6.5fH), f2(7.5fH), f3(10.5fH) and f4(9.5fh) are utilized as shown in FIG. 2, wherein fH represents a horizontal synchronizing frequency. Further, the output signals of the mixer 9 of FIG. 1 have frequencies fH, 2fH, 3fH and 4fH and the center frequencies of the BPFs 11 and 13 are selected at frequencies 3fH and fH, respectively, for the reasons described in the aforementioned patents.

Referring to FIG. 2, the pilot signals f1, f2, f3 and f4 are sequentially recorded together with the video signal on the tracks at each field of the video signal. The parts illustrated with oblique lines (A), (B), (A) . . . represent trails or traces effected in the direction of the arrow by one of the heads 3 during the tape stop states of the intermittent drive. Further, the labelled arrows (a), (b), . . . represent the tape feed between adjacent tape stop states of the intermittent drive.

In this embodiment, the movement of the tape and heads described with respect to the field still mode, in which each of the parts (A), (B), (A) . . . is traced for at least one field by one of the heads 3 in the tape stop states. However, this invention is also applicable to the frame still mode, in which two adjacent tracks are traced by both of the heads in the tape stop states.

Next, the operation of the embodiment shown in FIG. 1 is described with reference to FIGS. 4, 5 and 6. At the start in the flow chart shown in FIG. 6, the video signal together with the pilot signals are reproduced by one of the rotating heads in the tape stop state. At first, detection is effected of which part is traced by one of the heads 3. For this purpose, the local frequency generator 10 generates an output signal having frequency f2 or f4. If the output signal having the frequency f2 is suppled to the mixed 9 and the amplitude of the tracking error signal (ΔE) is larger than a predetermined level at the leading or trailing edge of the head exchanging signal (SW30), it is determined that one of the parts (A) is traced by one of the heads 3. Similarly, if the output signal having the frequency f4 is supplied to the mixer 9 and the amplitude of the tracking error signal (ΔE) is larger than a predetermined level at the leading or trailing edge of the head exchanging signal (SW30), it is determined that one of the parts (B) is traced by one of the heads 3.

Figure 3:
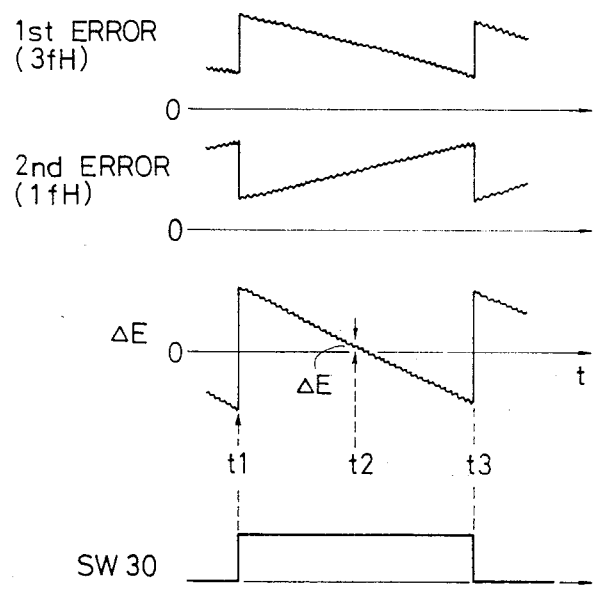
FIG. 3 illustrates waveforms of output signals in accordance with FIG. 1.

For example, as one of the parts (A) is traced by the rotating head 3 in the direction shown in FIG. 2 and the output signal having the frequency f2 is supplied from the local frequency generator 10 to the mixer 9, the first erro signal, the second error signal and the tracking error signal have a waveform as shown in FIG. 3. The tracking error signal is sampled at a timing (t2) within the tape stop state with the timing (t2) being determined in accordance with the relationship:

$$t2 - t1 = \tfrac{1}{2}(t3 - t1).$$

The sampled tracking error signal (ΔE) is supplied to the analog to digital converter 21.

The relationship between the tracking error signal (ΔE) and the deviation (ΔX) of the tape 1 is shown in FIG. 4 wherein the abscissa represents the deviation (ΔX) of the tape 1 from a noiseless still position, and the ordinate represents the sample tracking error signal (ΔE). A point Xp indicates the deviation corresponding to a track pitch P. Accordingly, the tracking error signal in response to the deviation (ΔX) is supplied to the microcomputer 20.

In the embodiment, the sampled tracking error signal (ΔE) is obtained by sampling the tracking error signal at the timing (t2). However, in order to increase the S/N ratio of the sampled tracking error signal (ΔE), it is better to average the tracking error signals at the timing (t2) of each field during the tape stop state. Further, it is desirable to integrate the values of the tracking error signals during at least one field period during the stop state. In the case of the tape stop state in which one of the parts (B) is traced by one of the heads 3, the operation is the same as described above except the frequency of the output signal of the local frequency generator 10. In this case, the frequency f4 is utilized as shown in FIG. 6.

Figure 6:
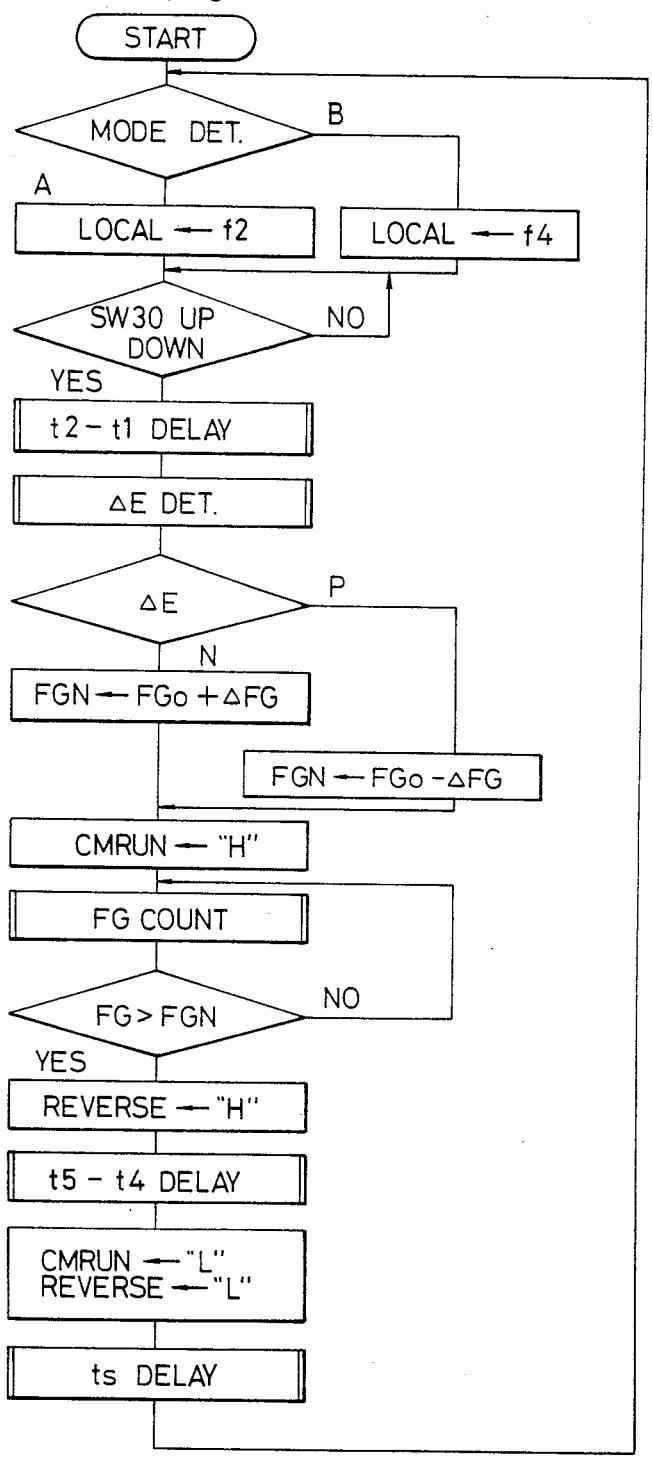
FIG. 6 is a flow chart for explaining a program executed in the microcomputer 20 of FIG. 1.

Next, as shown in FIG. 6, according to the polarity of the sampled tracking error signal, i.e., positive (P) or negative (N), an amount of feeding of the tape is controlled. Now, "FGo" is a count number (FGN) of the output pulses (FG) of the frequency generator 17 corresponding to a regular amount of feeding of the tape during one intermittent drive, that is, during one frame period drive. If, however, the sampled tracking error signal (ΔE) is negative, the count number (FGN) is changed from "FGo" to "FGN1=FGo+ΔFG". in which "ΔFG" is a unit value of the count number (FGN).

Referring to FIGS. 5(I), 5(II) and FIG. 6, in order to transfer the tape from the part (A) to the next part (B), the CPU 22 provides a control signal (CMRUN) at a high level (H) to drive the capstan motor 5 and starts to count the output pulses (FG) of the frequency generator 17. At a timing (t4), in which the count number (FGN) becomes "FGN1", the CPU 22 provides a control signal (REVERSE) at a high level (H) to brake the capstan motor 5 until a timing (t5) and then provides both control signals (CMRUN and REVERSE) at a low level (L) to stop the tape feeding. Here, the time period (t5−t4) is determined by detecting a set value of the variable resistor 24 through the analog digital converter 21. Further, if necessary, the microcomputer 20 adjusts a start timing (0), in which the control signal (CMRUN) becomes a high level.

The speed of the noiseless slow reproduction is determined by a time period (ts) of the stop state, which is at least one field period and depends on a set value of the variable resistor 25. In this embodiment, the CPU 22 controls the tape feeding by setting the count number (FGN) from the start timing (0) to the timing (t4). However, it is possible to set the count number (FGN) from the start timing (0) to the timing (t5) by controlling the timing (t4) and the power for braking of the capstan motor 5.

In the case of transferring the tape from the part (B) to the part (A) as shown in FIGS. 5(II) and 5(III), as the sampled tracking error signal (ΔE) is still negative, the count number (FGN) is adjusted to "FGN2 (=FGo+ΔFG)", and the tape is transferred. As the sampled tracking error signal (ΔE) becomes positive as shown in FIG. 5(III) during the next stop state, the count number (FGN) should be set to "FGo−ΔFG". For example, the microcomputer 20 sets "FGo" to be equal to 40 and "ΔFG" to be equal to 2. In this manner, any deviation between the tracks and the rotating magnetic head during an intermittent drive for noiseless slow motion may be compensated so that the information may be reproduced from the magnetic tape at variable speeds.

Next, another embodiment of the present invention will be described with reference to FIG. 7. In this embodiment, the unit value (ΔFG) of the count number (FGN) is varied corresponding to the amplitude of the sampled tracking error signal (ΔE). Accordingly, it is possible to lessen the lead time for accurate tracking. Referring to FIG. 7, the abscissa represents the sampled tracking error signal (ΔE) and the ordinate represents the optimum unit value (ΔFG). The optimum unit value (ΔFG) is varied from 20 to 1 in response to the sampled tracking error signal (ΔE) as shown in dotted line in FIG. 7. By using the optimum unit value (ΔFG), the deviation is compensated at only one intermittent drive.

In the cases described above, the count number (FGN) corresponding to the regular amount of feeding of the tape during one intermittent drive is constant, that is, "FGo". However, an optimum value of the count number may be varied from "FGO" by a time aging.

Figure 8:
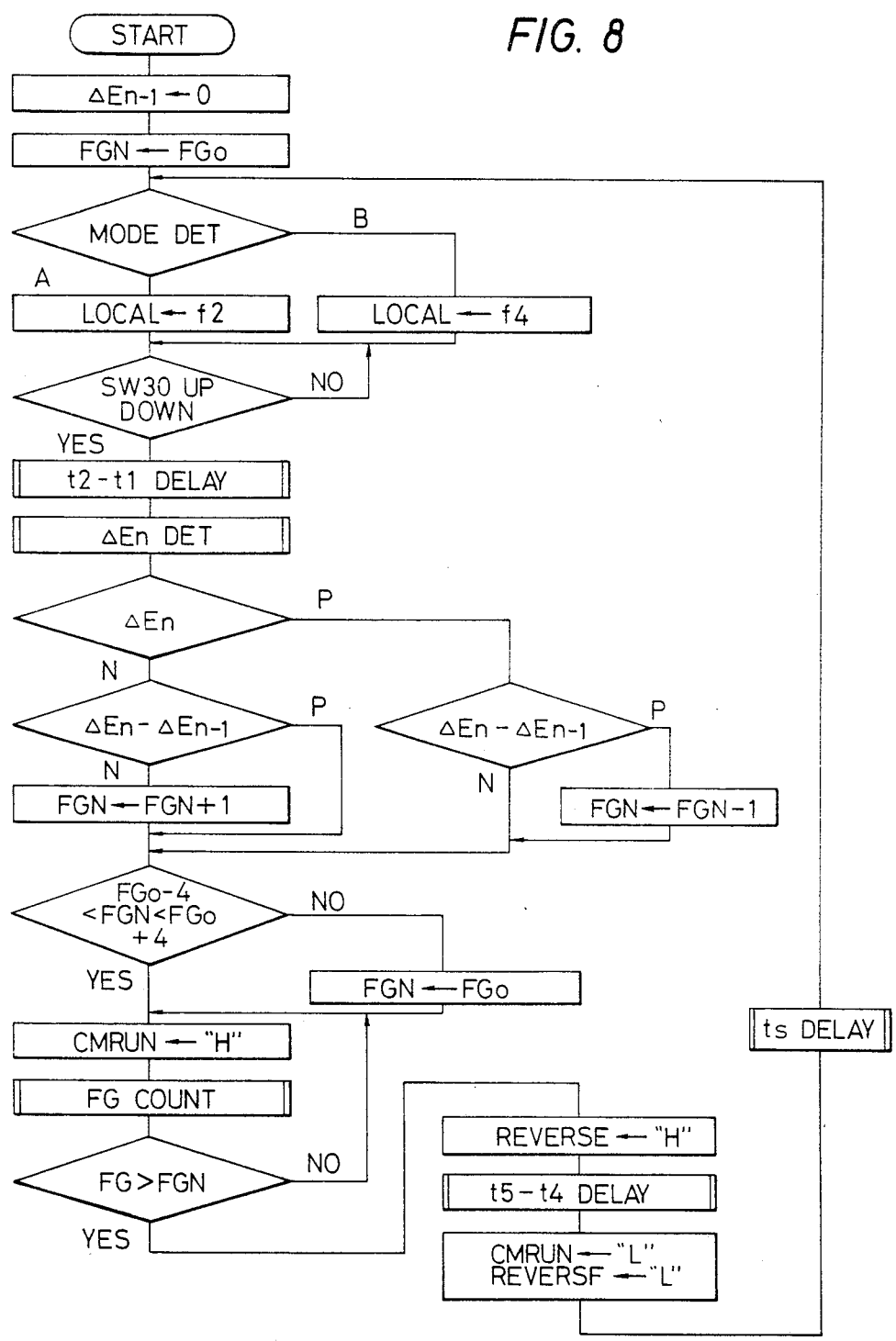
FIG. 8 is a flow chart for explaining another program executed in the microcomputer 20 of FIG. 1.

A further embodiment of the present invention will be described with reference to the flow chart of FIG. 8. In this embodiment, the optimum value of the count number (FGN) is automatically compensated by controlling the amount thereof corresponding to a difference between the current sampled tracking error signal (ΔEn) and the previous sampled tracking error signal (ΔEn−1). As shown in FIG. 8, if the sampled tracking error signal (ΔEn) is negative (N) and the result of subtracting the previous sampled tracking error signal (ΔEn−1) from the current sampled tracking error signal (ΔEn) is negative (N), the count number (FGN) is changed to "FGN+1". On the other hand, if the current sampled tracking error signal (ΔEn) is positive (P) and the result of subtracting the former sampled tracking error signal (ΔEn−1) from the sampled tracking error signal (ΔEn) is positive (P), the count number (FGN) is changed to "FGN−1". Further, in this embodiment, if the count number (FGN) does not satisfy the following relationship, the count number (FGN) is set back to the optimum value (FGo):

FGo−4<FGN<FGo+4.

This step is useful to return the count number (FGN) to the initial value, when the count number (FGN) differs (more than ±4) from the optimum value as, for example, due to a drop out, or the like. As the other steps of the flow chart of FIG. 8 are the same as that of the flow chart of FIG. 6, the explanation thereof is omitted.

The count number is changed at each intermittent drive in the above described embodiments. However, for example, it is possible to change the count number at every other frame (every four tracks). In this case, the frequency of the output signal of the local frequency generator 10 is fixed to one of f2 or f4.

As described above, the present invention makes it possible to provide variable speed reproduction by an intermittent drive in the system using pilot signals. Further, this invention makes it possible to provide a noiseless variable speed reproduction by averaging the tracking error signal at the microcomputer, and by the other techniques as described.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A method for reproducing information at variable speeds from a magnetic tape by compensating for a deviation between at least one track of the magnetic tape having information including pilot signals of different plural frequencies as a tracking signal recorded thereon and at least one rotating magnetic head of a rotating head helical scan type tape recording/reproducing apparatus during an intermittent drive so as to enable noiseless slow motion reproduction, the method comprising the steps of:

intermittently driving the tape;
   counting pulses indicative of the amount of feeding of the tape during the intermittent drive until the count number equals a set value corresponding to a regular amount of feeding of the tape during the intermittent drive so as to detect a timing for stopping of the feeding of the tape;
   producing a positive or negative tracking error signal from the pilot signals reproduced from the tape during a tape stop state of the intermittent drive; and
   adjusting the set value in response to the tracking error signal so as to control the stop position of the tape to compensate for the deviation and to enable noiseless slow motion reproduction.

2. A method according to claim 1, further comprising the step of feeding the tape during a subsequent intermittent drive and stopping the feeding of the tape when the count of the pulses equals the adjusted set value so that the deviation between the at least one track and the at least one rotating head is compensated.

3. A method according to claim 1, wherein the step of producing the tracking error signal includes averaging the tracking error signal by integration thereof at least one field period of the tape stop state.

4. A method according to claim 1, wherein the step of adjusting the set value includes adjusting the set value in response to a difference between the tracking error signal of a current tape stop state and the tracking error signal of a previous tape stop state.

5. A method according to claim 1, wherein the pilot signals of different frequencies are sequentially recorded together with a video signal on the tracks of the magnetic tape at each field of the video signal, and the step of producing the tracking error signal includes reproducing the pilot signals recorded on the tracks, mixing the pilot signals with at least one predetermined frequency to provide subtractive output frequency signals, passing the subtractive output frequency signals along two different filtering frequency paths, and comparing the output signals of the two paths to produce the tracking error signal.

6. A method according to claim 5, further comprising the step of sampling the tracking error signal at a predetermined time and utilizing the sampled tracking error signal for adjusting the set value.

7. A method according to claim 6, further comprising the step of producing pulses indicative of the amount of feeding of the tape by a frequency generator coupled to a capstan for enabling feeding of the tape.

8. A method according to claim 7, wherein a plurality of rotating magnetic heads are prodvied and the sampling of the tracking error signal at a predetermined time is controlled in accordance with a head exchanging signal.

9. An apparatus for reproducing information at variable speeds from a magnetic tape by compensating for a deviation between at least one track of the magnetic tape having information including pilot signals of different plural frequencies recorded thereon and at least one rotating magnetic head of a rotating head helical scan type tape recording/reproducing device, the apparatus comprising:
means for intermittently driving the tape;
means for counting pulses indicative of the amount of feeding of the tape during the intermittent drive until the count number equals a set value corresponding to a regular amount of feeding of the tape during the intermittent drive and for detecting a timing for stopping of the feeding of the tape;
means for producing a positive or negative tracking error signal form the pilot signals reproduced from the tape during a tape stop of the intermittent drive; and
means for adjusting the set value in response to the tracking error signal so as to control the stop position of the tape to compensate for the deviation and to enable noiseless slow motion reproduction.

10. An apparauts according to claim 9, wherein the helical scan type tape recording/reproducing device includes cylinder means having a plurality or rotating heads, said intermittent drive means including a capstan for feeding of the tape and a capstan motor, frequency generator means being coupled to said capstan for providing an output of a series of pulses indicative of the feeding of the tape by said capstan, and means for controlling said capstan motor in response to said means for counting and detecting.

11. An apparatus according to claim 10, wherein said means for adjusting the set value adjusts the set value for the subsequent intermittent drive for feeding of the tape so as to compensate for the deviation between the at least one track and the at least one rotating head.

12. An apparatus according to claim 11, wherein said means for counting and detecting and said adjusting means comprise a microcomputer.

13. An apparatus according to claim 11, wherein the pilot signals different frequencies are sequentially recorded together with a video signal on the tracks of the magnetic tape at each field of the video signal, and the means for producing the tracking error signal includes means for reproducing the pilot signals recorded on the tracks, means for mixing the pilot signals with at least one predetermined frequency to provide subtractive output frequency signals, means for processing the subtractive output frequency signals along two different paths, and means for comparing the processed signals to produce the tracking error signal.

14. An apparatus according to claim 13, further comprising means for sampling the tracking error signal at a predetermined time and utilizing the sampled tracking error signal for adjusting the set value.

15. An apparatus according to claim 12, wherein said microcomputer further includes means for averaging the tracking error signal by integration thereof during at least one field period of the tape stop state.

16. An apparatus according to claim 12, wherein said microcomputer further includes means for obtaining a difference between the tracking error signal of a current tape stop state and the tracking error signal of a previous tape stop state, said adjusting means adjusting the set value in response to the difference.

17. A method for reproducing information at variable speeds from a magnetic tape by compensating for a deviation between at least one track of the magnetic tape having information including pilot signals of different plural frequencies as a tracking signal recorded thereon and at least one rotating magnetic head of a rotating head helical scan type tape recording/reproducing apparatus so as to enable noiseless slow motion reproduction, the method comprising the steps of:
intermittently feeding the tape;
counting pulses indicative of the amount of the feeding of the tape;
stopping the feeding of the tape in response to a timing at which a count number of said pulses becomes a set value corresponding to a regular amount of feeding of the tape;
producing a positive or negative tracking error signal from the pilot signals reproduced by the rotating magnetic head from the tape during a tape stop state; and
adjusting said set value in response to said tracking error signal so as to control the stop position of the tape to compensate for the deviation and to enable noiseless slow motion reproduction.

18. An apparatus for reproducing information at variable speeds from a magnetic tape by compensating for a deviation between at least one track of the magnetic tape having information including pilot signals of different plural frequencies recorded thereon and at least one rotating magnetic head of a rotating head heical scan type recording/reproducing system, the apparatus comprising:
means for controlling an intermittent feeding of the magnetic tape;
means for counting pulses indicative of the amount of the feeding of the tape during the feeding of the tape;
means for generating a timing signal for stopping of the feeding of the tape in response to a timing at which a count number of said pulses becomes a set value, said timing signal being provided to said controlling means so as to stop the feeding of the tape;
means for producing a positive or negative tracking error signal from the pilot signals reproduced by the rotating magnetic head from the tape after stopping the feeding of the tape; and
means for adjusting the set value in response to said tracking error signal so as to control the stop position of the tape to compensate for the deviation and to enable noiseless slow motion reproduction.

19. An apparatus according to claim 18, wherein said controlling means comprises a capstan, a capstan motor for rotating said capstan and a servo circuit for controlling the rotation of said capstan motor.

* * * * *